(12) United States Patent
Bhargava et al.

(10) Patent No.: US 11,874,774 B2
(45) Date of Patent: Jan. 16, 2024

(54) MECHANISM TO EFFICIENTLY RINSE MEMORY-SIDE CACHE OF DIRTY DATA

(71) Applicant: Advanced Micro Devices, Inc., Santa Clara, CA (US)

(72) Inventors: Ravindra N. Bhargava, Austin, TX (US); Ganesh Balakrishnan, Austin, TX (US); Joe Sargunaraj, Santa Clara, CA (US); Chintan S. Patel, Austin, TX (US); Girish Balaiah Aswathaiya, Austin, TX (US); Vydhyanathan Kalyanasundharam, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 27 days.

(21) Appl. No.: 17/031,834

(22) Filed: Sep. 24, 2020

(65) Prior Publication Data

US 2022/0091991 A1 Mar. 24, 2022

(51) Int. Cl.

| | |
|---|---|
| *G06F 12/08* | (2016.01) |
| *G06F 12/0891* | (2016.01) |
| *G06F 9/46* | (2006.01) |
| *G06F 12/0813* | (2016.01) |
| *G06F 12/0831* | (2016.01) |
| *G06F 12/084* | (2016.01) |

(52) U.S. Cl.
CPC ......... *G06F 12/0891* (2013.01); *G06F 9/467* (2013.01); *G06F 12/084* (2013.01); *G06F 12/0813* (2013.01); *G06F 12/0833* (2013.01)

(58) Field of Classification Search
CPC ............ G06F 12/0813; G06F 12/0891; G06F 12/084; G06F 12/0833; G06F 12/08; G06F 9/467
See application file for complete search history.

(56) References Cited

U.S. PATENT DOCUMENTS

| | | | |
|---|---|---|---|
| 2002/0007404 A1* | 1/2002 | Vange | H04L 67/1034 709/217 |
| 2002/0046330 A1* | 4/2002 | Suzuki | G06F 11/2071 711/162 |

(Continued)

FOREIGN PATENT DOCUMENTS

| | | | | |
|---|---|---|---|---|
| EP | WO 2016160202 A | * | 10/2016 | ............. G06F 13/16 |
| WO | WO-2012116369 A2 | * | 8/2012 | ......... G06F 12/0246 |

OTHER PUBLICATIONS

R. Huggahalli, R. Iyer and S. Tetrick, "Direct cache access for high bandwidth network I/O," 32nd International Symposium on Computer Architecture (ISCA'05), 2005, pp. 50-59.*

(Continued)

*Primary Examiner* — Pierre Michel Bataille
(74) *Attorney, Agent, or Firm* — FIG. 1 Patents (57) ABSTRACT

A method includes, in response to each write request of a plurality of write requests received at a memory-side cache device coupled with a memory device, writing payload data specified by the write request to the memory-side cache device, and when a first bandwidth availability condition is satisfied, performing a cache write-through by writing the payload data to the memory device, and recording an indication that the payload data written to the memory-side cache device matches the payload data written to the memory device.

22 Claims, 5 Drawing Sheets

(56) References Cited

U.S. PATENT DOCUMENTS

| | | | |
|---|---|---|---|
| 2003/0037205 A1* | 2/2003 | Hathaway | H04L 47/822 |
| | | | 711/146 |
| 2004/0168031 A1* | 8/2004 | Haskins | G06F 12/0804 |
| | | | 711/E12.04 |
| 2011/0258391 A1* | 10/2011 | Atkisson | G06F 11/108 |
| | | | 711/E12.017 |
| 2012/0317354 A1* | 12/2012 | Yokota | G06F 11/2071 |
| | | | 711/E12.019 |
| 2013/0254488 A1 | 9/2013 | Kaxiras et al. | |
| 2014/0189252 A1 | 7/2014 | Biswas | |
| 2016/0062891 A1* | 3/2016 | Guthrie | G06F 12/12 |
| | | | 711/122 |
| 2016/0062892 A1* | 3/2016 | Guthrie | G06F 12/12 |
| | | | 711/122 |
| 2018/0203799 A1 | 7/2018 | Gaur et al. | |
| 2019/0034335 A1* | 1/2019 | Martinez De La Torre | |
| | | | G06F 12/0864 |
| 2019/0188137 A1 | 6/2019 | Kalyanasundharam et al. | |
| 2019/0251026 A1* | 8/2019 | Lowe-Power | G06F 12/0804 |
| 2021/0400124 A1* | 12/2021 | Pardo | H04L 69/324 |

OTHER PUBLICATIONS

J. Alsop, M. Sinclair and S. Adve, "Spandex: A Flexible Interface for Efficient Heterogeneous Coherence," 2018 ACM/IEEE 45th Annual International Symposium on Computer Architecture (ISCA), 2018, pp. 261-274.*

Z. Al-Waisi and M. O. Agyeman, "An overview of on-chip cache coherence protocols," 2017 Intelligent Systems Conference (IntelliSys), London, UK, 2017, pp. 304-309.*

International Search Report and Written Opinion, Application No. PCT/US2021/050980 dated Dec. 9, 2021.

Ros Alberto et al: "Racer: TSO consistency via race detection", 2016 49th Annual IEEE/ACM International Symposium on Microarchitecture (Micro), IEEE, Oct. 15, 2016 (Oct. 15, 2016), pp. 1-13, XP033022479, DOI: 10.1109/MICRO.2016.7783736 [retrieved on Dec. 14, 2016].

PCT/US21/50980, "International Preliminary Report on Patentability", PCT Application No. PCT/US21/50980, Apr. 6, 2023, 12 pages.

* cited by examiner

FIGURE 5

MECHANISM TO EFFICIENTLY RINSE MEMORY-SIDE CACHE OF DIRTY DATA

BACKGROUND

Modern computing systems typically rely on multiple caches in a cache hierarchy to improve memory performance. Compared to main memory, a cache is a smaller and faster memory device that stores data that is frequently accessed or expected to be used in the near future so that the data can be accessed with low latency. Such cache devices are typically located between a processing unit that issues memory requests and the main memory device, and are often implemented in static random access memory (SRAM). A memory-side cache is a dedicated cache attached to a particular memory device or partition that caches data being written to and read from the memory device by other devices.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

A memory-side cache attached to a main memory device (e.g., DRAM) improves performance by caching data that is frequently read from or written to the main memory device. Memory access requests directed to the main memory are serviced with lower latency from the memory-side cache when the requested data is available in the cache. However, the presence of a memory-side cache can interfere with the efficient ordering of DRAM transactions. Due to DRAM timing constraints, the ordering of a set of memory transactions (e.g., read and write requests) affects the speed at which the transactions can be performed in the DRAM. When a portion of the transactions in the set result in a cache hit and are therefore serviced from the memory-side cache, the remaining transactions resulting in a cache miss are serviced from the DRAM in a different sequence than in the original order in which they arrived. In addition, a cache miss causes a victim entry to be removed from the cache and updated in DRAM if the victim is dirty, which can also change the access order. This tends to defeat mechanisms that aim to reorder DRAM transactions to achieve the highest possible bandwidth.

The operation of a memory-side cache and its main memory is characterized by phases in which 1) the memory-side cache experiences a low hit rate and a larger number of accesses reach the main memory (e.g., while the cache is being populated with a working set of data for a new workload), and 2) the memory-side cache experiences a high hit rate and spare main memory bandwidth is underutilized. Accordingly, one embodiment of a memory-side cache device utilizes the spare DRAM bandwidth observed during the high hit rate phase to perform read and write rinsing of the cached data. The rinsing is performed when available DRAM bandwidth is detected, and is performed for data that is marked as dirty in the memory-side cache when the data is accessed.

When rinsing is performed, the original order of the memory transactions, which tends to be more efficient, is preserved because transactions are sent to the DRAM whether they result in a cache hit or a cache miss. It is generally expected that the original sequence of transactions is more efficient from a DRAM efficiency standpoint. In addition, performing memory rinsing when DRAM bandwidth is available reduces the number of memory transactions that will be performed due to the eviction of dirty data from the cache, which could otherwise interfere with the memory access order, or could consume memory bandwidth when DRAM usage is already high during phases of the program when cache miss rates are high.

Figure 1:
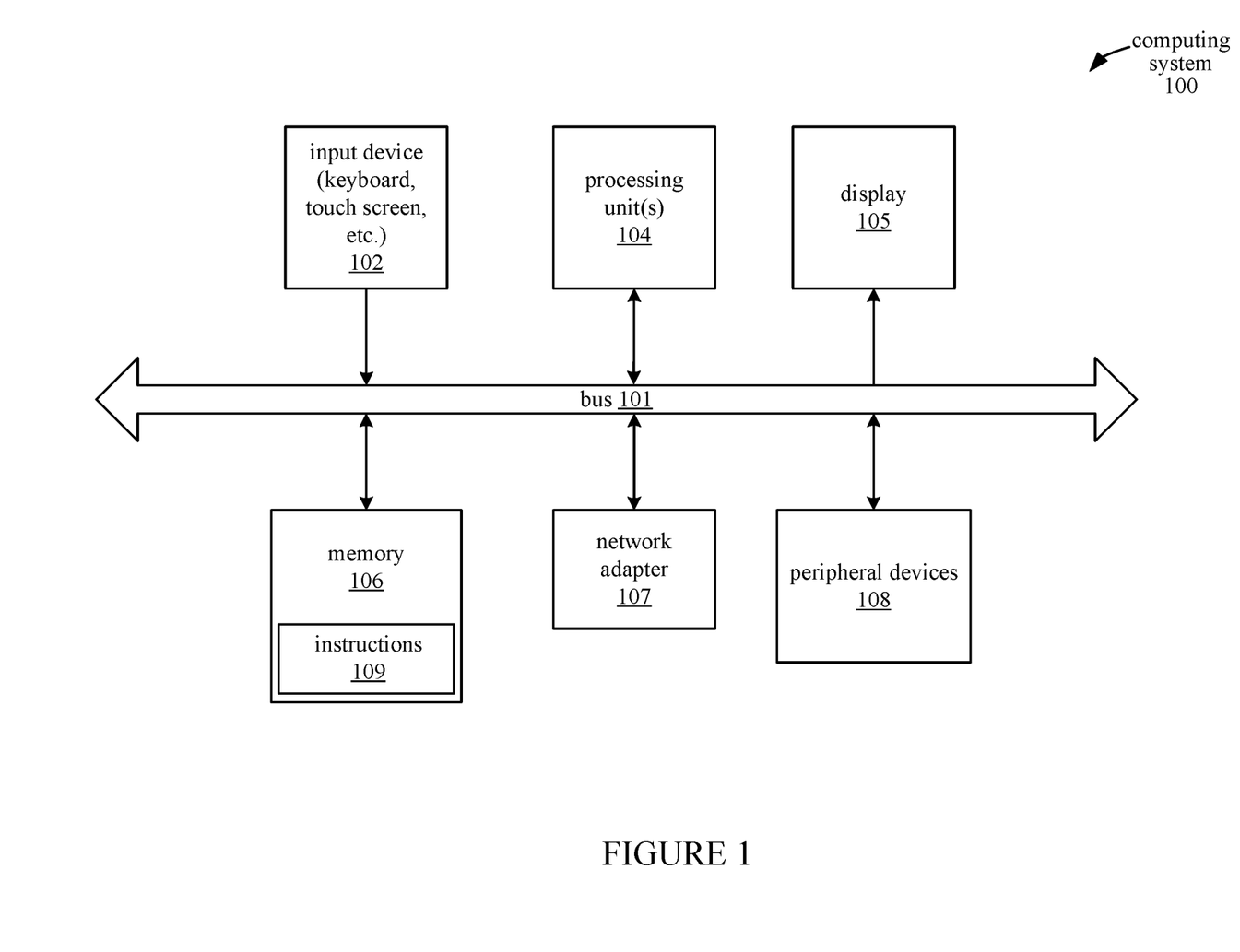
FIG. 1 illustrates a computing system, according to an embodiment.

FIG. 1 illustrates an embodiment of a computing system 100 in which the memory rinsing mechanism is implemented. In general, the computing system 100 is embodied as any of a number of different types of devices, including but not limited to a laptop or desktop computer, mobile device, server, etc. The computing system 100 includes a number of components 102-108 that communicate with each other through a bus 101. In computing system 100, each of the components 102-108 is capable of communicating with any of the other components 102-108 either directly through the bus 101, or via one or more of the other components 102-108. The components 101-108 in computing system 100 are contained within a single physical enclosure, such as a laptop or desktop chassis, or a mobile phone casing. In alternative embodiments, some of the components of computing system 100 are embodied as peripheral devices such that the entire computing system 100 does not reside within a single physical enclosure.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 may include mass storage devices, location detection devices, sensors, input devices, or other types of devices used by the computing system 100.

Computing system 100 includes one or more processing units 104, which in the case of multiple processing units 104 are capable of operating in parallel. The processing units 104 receive and execute instructions 109 that are stored in the memory subsystem 106. In one embodiment, each of the processing units 104 includes multiple computing nodes that reside on a common integrated circuit substrate. Memory subsystem 106 includes memory devices used by the computing system 100, such as random-access memory (RAM) modules, read-only memory (ROM) modules, hard disks, and other non-transitory computer-readable media.

Some embodiments of computing system 100 may include fewer or more components than the embodiment as illustrated in FIG. 1. For example, certain embodiments are implemented without any display 105 or input devices 102. Other embodiments have more than one of a particular component; for example, an embodiment of computing system 100 could have multiple buses 101, network adapters 107, memory devices 106, etc.

Figure 2:
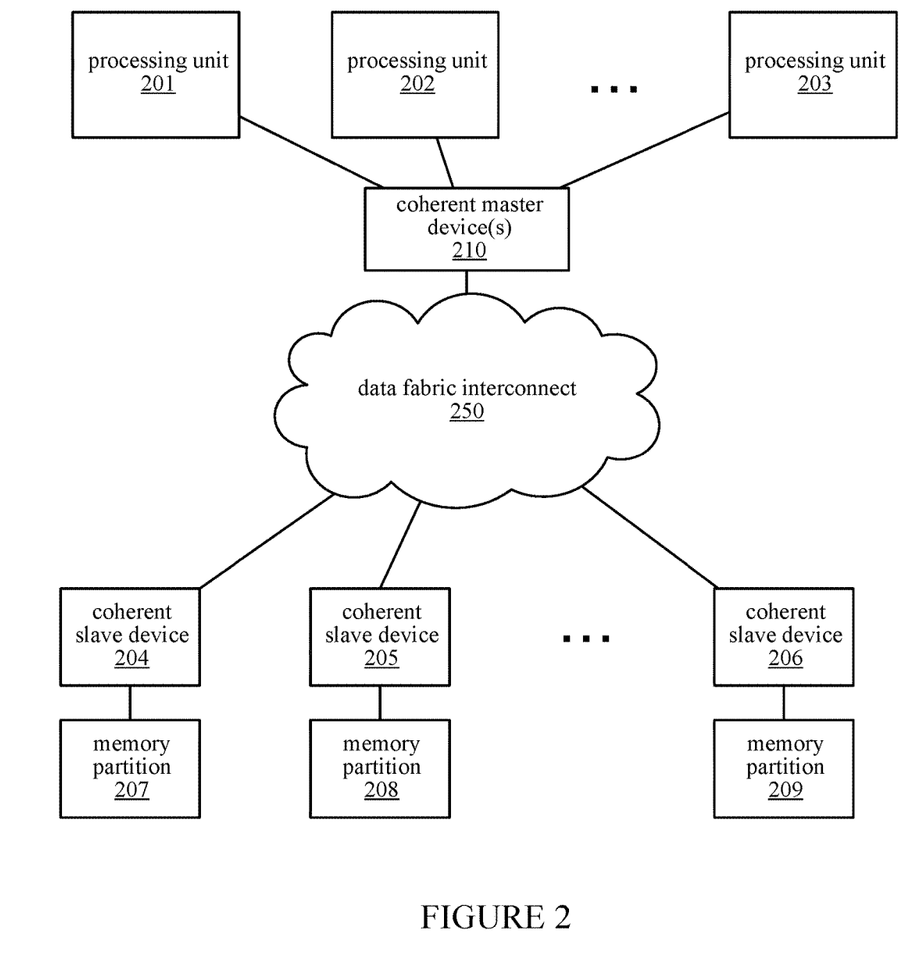
FIG. 2 illustrates multiple computing nodes connected via a data fabric interconnect, according to an embodiment.

In one embodiment, the processing units 104 and memory 106 in the computing system 100 are implemented as multiple processing units and memory partitions, respectively, connected by a data interconnect fabric 250 as illustrated in FIG. 2. The data interconnect fabric 250 connects multiple computing nodes together, including processing units 201-203 and memory partitions 207-209. The processing units 201-203 are connected to the data fabric interconnect 250 via one or more coherent master devices 210, and the memory partitions 207-209 are connected to the data fabric interconnect 250 via coherent slave devices 204-206, respectively. In one embodiment, these nodes 201-219 reside within the same device package and on the same integrated circuit die. For example, all of the nodes 201-209 can be implemented on a monolithic central processing unit (CPU) or graphics processing unit (GPU) die having multiple processing cores. In an alternative embodiment, some of the nodes 201-209 reside on different integrated circuit dies. For example, the nodes 201-206 can reside on multiple chiplets attached to a common interposer, where each chiplet has multiple (e.g., 4) processing cores.

The interconnect 250 includes multiple interconnect links that provide a transmission path for the nodes 201-209 to communicate with each other. In one embodiment, the interconnect fabric 250 provides multiple different transmission paths between any pair of origin and destination nodes, and a different transmission path for any given origin node to communicate with each possible destination node.

Memory requests issued by the processing units 201-203 that are directed to one of the memory partitions 207-209 are transmitted over the interconnect 250 through one or more coherent master devices 210 and are received by the memory partition's coherent slave device. For example, memory requests to access data stored in memory partition 207 are received by the coherent slave device 204. In one embodiment, the coherent slave device 204 reorders memory transactions based on DRAM timing constraints to maximize the throughput of the memory partition 207. The coherent slave device 204 then transmits the reordered memory requests to the memory partition for servicing.

Figure 3:
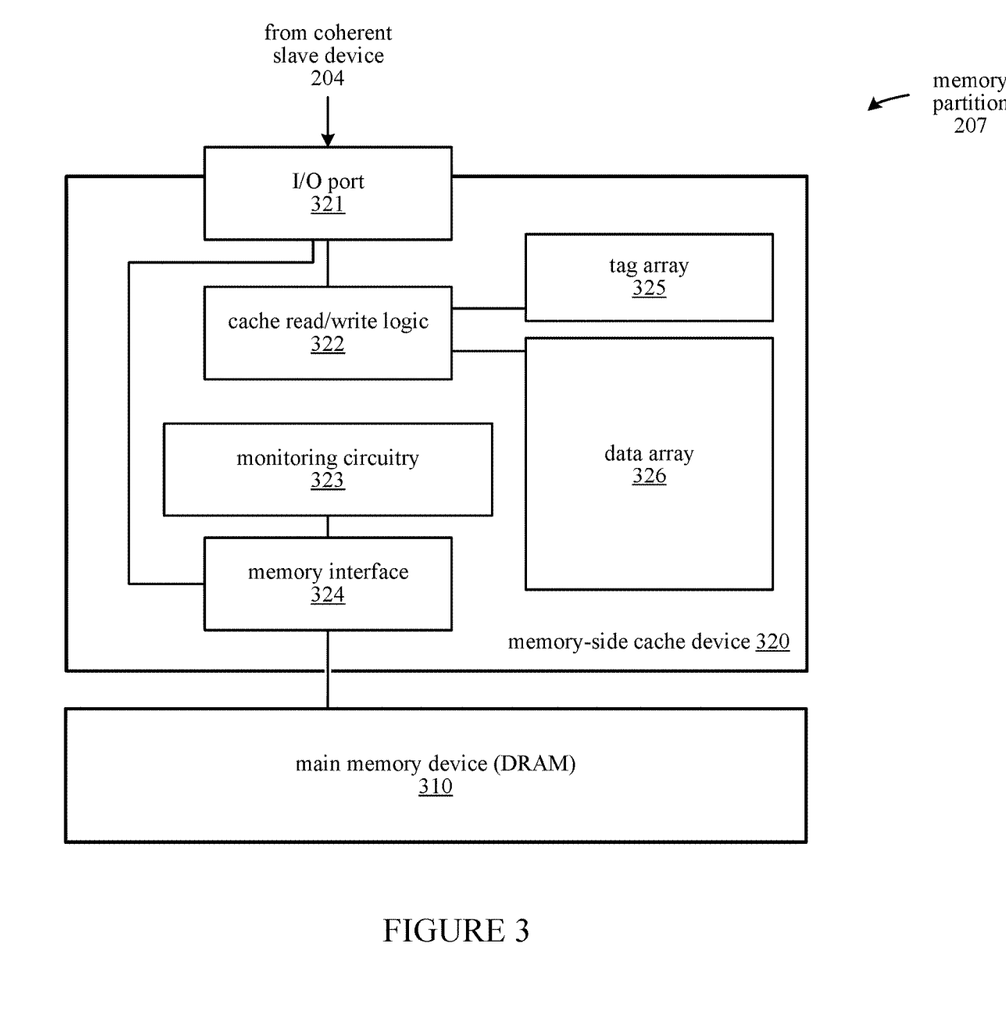
FIG. 3 illustrates components in a memory partition, according to an embodiment.

FIG. 3 illustrates components in a memory partition 207 in the computing system 100, according to an embodiment. The memory partition 207 includes a DRAM device 310 for storing data, and a memory-side cache device 320 for caching the data stored in DRAM 310. A cache controller in the memory-side cache device 320 includes the logic circuit modules 321-324. The memory-side cache device 320 also includes a data array 326 for storing the cached data and a tag array 325 for storing metadata for the cached data. Memory transactions, such as read or write requests, generated by the processing units 201-203 are received from the data fabric interconnect 250 by a coherent slave device 204, are reordered by the coherent slave device 204 for maximizing DRAM throughput, and forwarded in the reordered sequence to the input/output (I/O) port 321 of the memory-side cache device 320 in the memory partition 207.

The memory-side cache 320 includes monitoring circuitry 323 that determines, based on information from the memory interface 324, one or more metrics indicating the bandwidth availability for the attached DRAM device 310. Read and write rinsing of cached data in the memory-side cache 320 are enabled when the one or more bandwidth availability metrics indicate that sufficient DRAM bandwidth is available. In one embodiment, read rinsing and write rinsing are enabled independently based on different bandwidth availability metrics. Write rinsing refers to the updating of backing data in the DRAM device 310 to match cached data in the memory-side cache 320 in response to a write request for the data. Read rinsing refers to updating the backing data in the DRAM device 310 to match the cached data when the data is read from the cache 320.

When write rinsing is enabled, data is written through the cache for write requests received at the I/O port 321. That is, the payload data of each of the write requests received by the memory-side cache 320 is written to an entry in the cache data array 326 (by cache read/write logic 322) and is also written to a memory location in the DRAM 310 (via memory interface 324) whether the request resulted in a cache hit or cache miss. The cache read/write logic 322 marks the data as "clean" in the tag array 325 (e.g., by deasserting a "dirty" bit in a tag associated with the written cache entry), which indicates that the cached copy of the data matches the backing copy of the data in DRAM 310.

For a set of write requests directed to the DRAM 310, one or more upstream devices reorder the write requests to maximize the throughput for writing the data to the DRAM 310. The coherent slave 204 transmits the write requests to the memory-side cache device 320 according to the determined write sequence. When write rinsing is enabled, the payload data for the write requests is written to the DRAM 310 in an order corresponding to the determined write sequence. Since the data for each write request is written to the DRAM 310 whether the write request causes a cache hit or cache miss, the data is written to the DRAM 310 in the same order (i.e., the optimized write sequence) in which it is received by the cache device 320.

Writing through the cache 320 reduces the amount of dirty data in the cache 320. As a result, fewer dirty lines are evicted when cache misses occur and capacity is reallocated for the missed data to be added to the cache 320. Dirty data that is being evicted is read out of the cache 320 so that its backing data in DRAM 310 can be updated. However, the read-out is not needed when the data being evicted is clean, since the backing data does not need updating. Power consumption by the cache 320 therefore decreases due to the reduced number of reads from the cache 320. In addition, fewer write transactions are sent to the DRAM 310 that could otherwise interfere with the optimal ordering of DRAM transactions.

When read rinsing is enabled and read requests are received at the memory-side cache 320 that result in a cache hit in the memory-side cache 320, the cache read/write logic 322 reads and returns the data requested by each read request from the data array 326. Read rinsing is enabled when spare DRAM bandwidth is available; thus, the spare bandwidth is used for rinsing dirty cached data when it is read. The read/write logic 322 checks the tag array 325 to determine if the requested data is marked as "dirty" in the cache and, if so, the data is flushed via the memory interface 324, which updates the corresponding backing data in the DRAM 310 with the cached version of the data. The cache read/write logic then marks the cached data as "clean".

Figure 4:
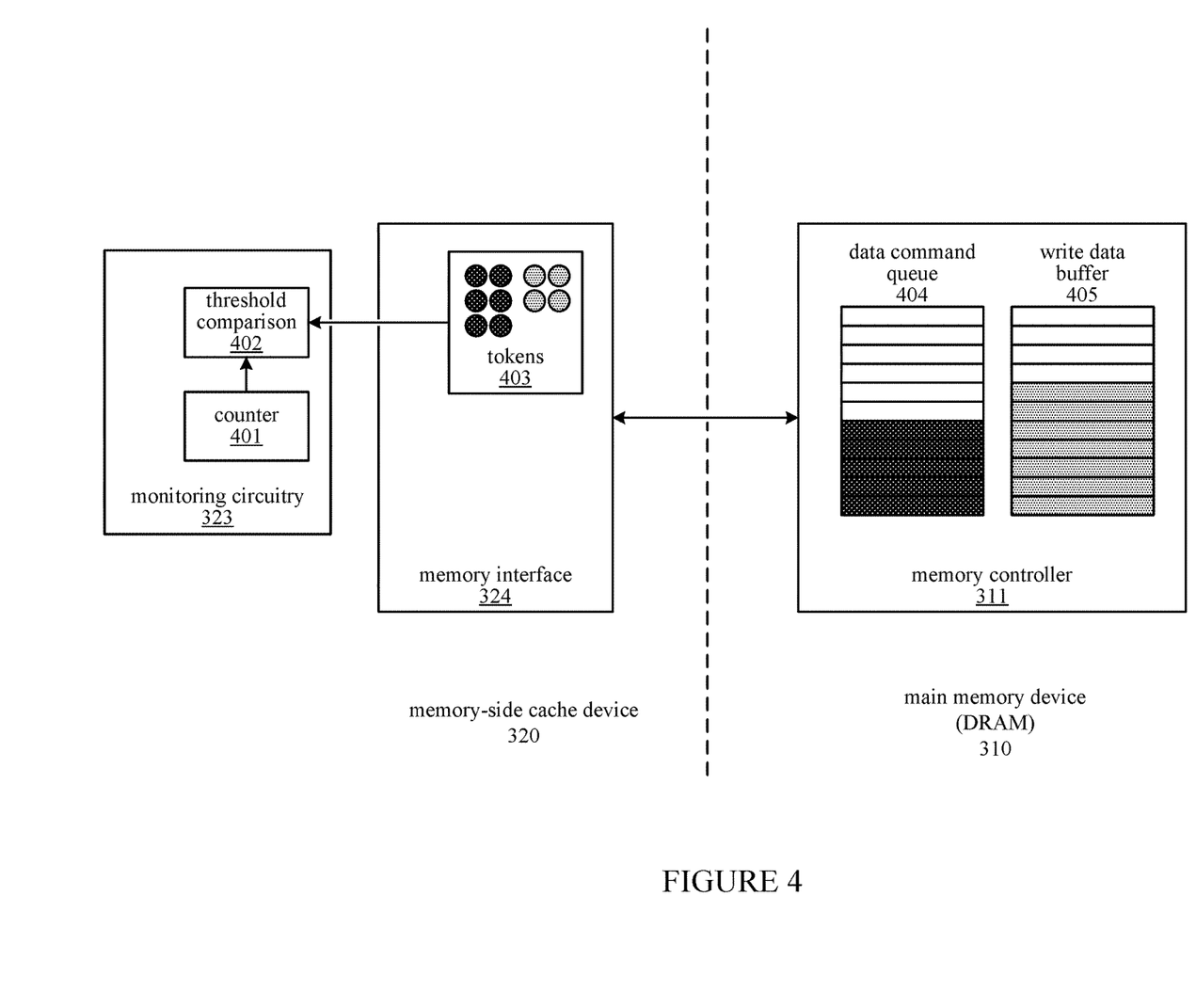
FIG. 4 illustrates an interface between a memory-side cache device and a main memory device, according to an embodiment.

FIG. 4 illustrates components in the memory-side cache device 320 and the DRAM device 310, according to an embodiment. The monitoring circuitry 323 and memory interface 324 in the memory-side cache device 320 are connected to the memory controller 311 in the DRAM device 310. The memory interface 324 sends memory transactions (e.g., read and write requests) to the memory controller 311, which performs the requested reads and writes in the DRAM circuits.

Monitoring circuitry 323 determines one or more bandwidth availability metrics which control whether read and/or write rinsing is enabled based on information obtained from the memory interface 324. The monitoring circuitry also includes a counter 401 that tracks the total number of write transactions, including read and write rinse transactions that have occurred within a given time window (e.g., defined by a number of cycles, milliseconds, etc.). The counter 401 participates in read rinse and cache write-through transactions by incrementing a counter value for a current time period in which the transaction is being performed. Read rinses and write-through transactions enabled and are performed while the counter value has not exceeded a predetermined maximum number of transactions for the time period. The counter 401 is thus used to limit the number of memory rinse transactions over time. In one embodiment, the counter 401 tracks the number of read rinse and write rinse transactions separately and compares each value to its own maximum value.

In one embodiment, the counter 401 is used to enforce a maximum number of memory rinse transactions within each of a series of time periods. In this case, the counter 401 resets at the beginning of each time period. Alternatively, the counter 401 tracks the number of rinse transactions within a most recent time window, so that transactions greater than a given age do not contribute to the count value.

The cache controller in the memory-side cache device 320 includes the memory interface 324, which interfaces with the memory controller 311 of the DRAM device 310. The memory interface 324 sends memory transactions to the memory controller 311, which performs the requested transactions in the DRAM cells. The memory controller 311 includes two queues 404 and 405 for storing incoming memory transactions. The data command queue 404 stores commands indicating the action to be performed, while the write data buffer 405 stores data to be written.

The cache controller of the memory-side cache device 320 performs flow control for its communications with the memory controller 311 using a token arbitration mechanism. As illustrated in FIG. 4, each token represents an entry in the data command queue 404 or the write data buffer 405. For example, six data command queue tokens each represent one of six available entries in the data command queue 404, while four write data buffer tokens each represent one of four available entries in the write data buffer 405. The memory interface 324 in the cache controller issues memory access requests to the memory controller 311 when a sufficient number of tokens is available, indicating that sufficient space is free in the buffers 404 and 405 for receiving the request. When the request is sent, the tokens are consumed. When the memory controller 311 has freed the space in the buffers 404 and 405 (e.g., when the request has been completed), the memory controller 311 returns the tokens to the cache controller's memory interface 324. In one embodiment, the read rinse and write-through transactions each use an entry in the data command queue 404 and an entry in the write data buffer 405.

The monitoring circuitry 323 determines one or more bandwidth availability metrics based on an indication of the available bandwidth received from the memory device 310. In an embodiment in which the token arbitration mechanism is used, the available memory bandwidth corresponds to the amount of space available in the data command queue 404 and the write data buffer 405, and is thus indicated by the number of tokens available for each of the buffers 404 and 405. Accordingly, the monitoring circuitry 323 determines one or more bandwidth availability metrics based on the number of tokens available for each of the command queue 404 and the write data buffer 405. A greater number of available tokens for either of the buffers 404 and 405 corresponds to a greater amount of available memory bandwidth.

The monitoring circuitry 323 determines a different bandwidth availability metric for each of the read rinsing and write-through mechanisms. The threshold comparison logic 402 compares each metric to a different threshold. The read rinsing and write-through mechanisms can thus by enabled and disabled under different conditions. If the threshold comparison logic 402 determines that the available bandwidth indicated by a bandwidth availability metric for the read rinsing mechanism is greater than its corresponding threshold (e.g., the number of available tokens exceeds a threshold number of tokens for each buffer 404 and 405), then the read rinsing mechanism is enabled. That is, if the bandwidth availability satisfies a condition (e.g., being above a threshold), then the read-rinsing and write-through mechanisms can be enabled. Similarly, if the threshold comparison logic 402 determines that the available bandwidth indicated by a bandwidth availability metric for the write-through mechanism is greater than its corresponding threshold, then the write-through mechanism is enabled.

Figure 5:
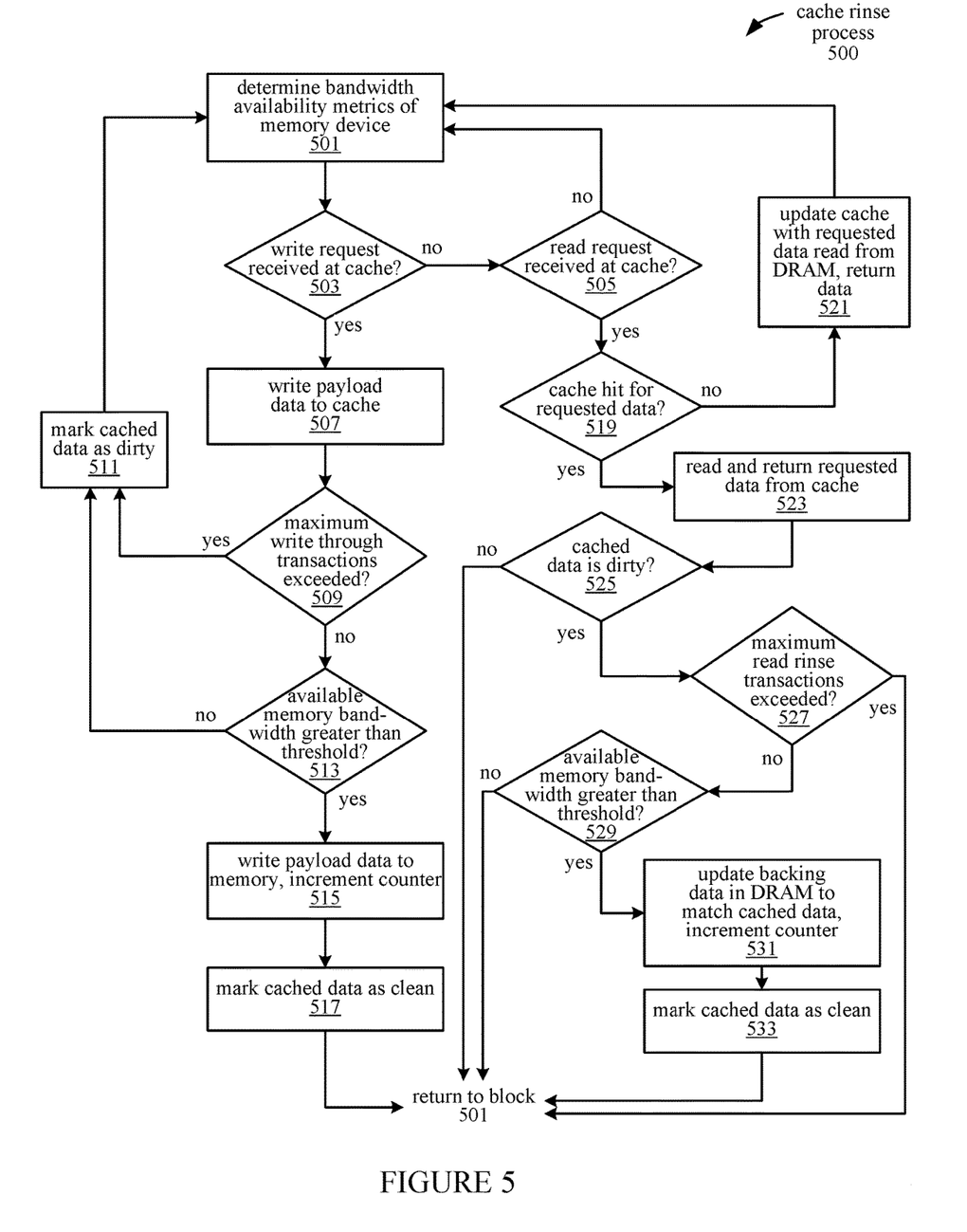
FIG. 5 illustrates a process for rinsing a memory-side cache, according to an embodiment.

FIG. 5 illustrates a process 500 for rinsing cached data when memory bandwidth is available, according to an embodiment. The rinsing process 500 is performed by components in the computing system 100, including the memory-side cache device 320 and DRAM device 310.

At block 501, the monitoring circuitry 323 determines one or more bandwidth availability metrics for the DRAM device 310. The monitoring circuitry 323 monitors the number of tokens 403 representing available entries in the data command queue 404 and write data buffer 405 so these metrics can be compared with one or more different threshold values to determine whether sufficient memory bandwidth is available for performing proactive read rinsing or write through transactions.

At block 503, if no write request is received at the memory-side cache 320, the process 500 continues at block 505. At block 505, if no read request is received at the memory-side cache 320, the process 500 returns to block 501. The monitoring circuitry 323 thus continues monitoring the availability of memory bandwidth for the DRAM device 310 when no memory requests are being received.

At block 503, when a write request is received at the I/O port 321 of the cache device 320, the cache read/write logic 322 writes the payload data specified by the write request to an entry in the data array 326. At block 509, the threshold comparison logic 402 compares the number of write-through transactions performed for the current time period (as indicated by the counter 401) to a maximum number. If the maximum number of write-through transactions has been exceeded, a write-through is not performed, and the cache read/write logic 322 marks the cached data as 'dirty' in its corresponding tag in the tag array 325. The process 500 returns to block 501 to continue monitoring the memory bandwidth availability metrics.

At block 509, if the maximum number of write-through transactions has not been exceeded, as indicated by the counter 401, the process 500 continues at block 513. At block 513, the monitoring circuitry 323 determines whether the available memory bandwidth is greater than a threshold for enabling write-through transactions. In particular, the threshold comparison logic 402 compares the number of available tokens 403 to the threshold. If the number of tokens exceeds the threshold, then write-through transactions are enabled. In one embodiment, the number of available tokens for each of the buffers 404 and 405 are compared to their own respective thresholds, and write-through transactions are enabled when both thresholds are exceeded. When the available memory bandwidth is not greater than the threshold, then write-through transactions are not enabled and the process 500 continues at block 511. At block 511, the cache read/write logic 322 marks the cached data as 'dirty', and the process 500 returns to block 501 to continue monitoring the memory bandwidth availability metrics.

At block 513, when the available memory bandwidth is greater than the threshold, then write-through transactions are enabled. The memory interface 324 performs a write-through of the payload data by writing the payload data to the DRAM device 310, as provided at block 515. The counter 401 is incremented to count the write-through transaction in the current time period. At block 517, the cache read/write logic 322 marks the cached data as 'clean' (e.g., by deasserting a 'dirty' bit in a tag associated with the entry containing the cached data) to record an indication that the payload data written to the memory-side cache device 320 matches the payload data written to the DRAM device 310. From block 517, the process 500 returns to block 510 to continue monitoring the memory bandwidth.

Blocks 503-517 thus repeat for each write request received at the I/O port 321 of the cache device 320 to perform cache write-through when sufficient memory bandwidth is available and when the number of write-through transactions has not exceeded a maximum number. As a result, when the write-through mechanism is enabled, payload data is written to the memory device 310 in an order corresponding to the sequence in which the write requests were originally received.

At block 505, when a read request is received at the I/O port 321 of the memory-side cache device 320, the cache read/write logic 322 at block 519 checks the tag array 325 to determine whether the requested data is in the data array 326. When the read request results in a cache miss, then the requested data is read from DRAM device 310. The cache read/write logic 322 updates the data array 326 and tag array 325 to include the data, and the data is returned to complete the request, as provided at block 521. From block 521, the process 500 returns to block 501 to continue monitoring memory bandwidth availability.

At block 519, when the read request results in a cache hit, the cache read/write logic 322 reads and returns the requested data from the data array 326, as provided at block 523. At block 525, the cache read/write logic 322 checks the tag for the data in the tag array 325 to determine whether the data is dirty (e.g., a 'dirty' bit for the data's entry is asserted). If the data is not dirty, then the cached data already matches its backing data in the DRAM device 310, and the process 500 returns to block 501 to continue monitoring the memory bandwidth availability without performing a read rinse.

At block 525, if the cached data is dirty, the cached data does not match its backing data in the DRAM device 310 and the process 500 continues at block 527. At block 527, the monitoring circuitry 323 determines whether the maximum number of read rinse transactions has been exceeded. The threshold comparison logic 402 compares the number of read rinse transactions that have been counted by counter 401 for the current time period with the maximum number of read rinse transactions allowed for the current time period. If the maximum number of read rinse transactions has been exceeded, then a read rinse is not performed and the process 500 returns to block 501.

At block 527, if the maximum number of read rinse transactions for the current time period has not been exceeded, the process 500 continues at block 529. At block 529, the monitoring logic determines whether the available memory bandwidth exceeds a threshold for enabling read rinsing. In one embodiment, the threshold comparison logic 402 compares the number of available data command queue 404 and write data buffer 405 tokens to respective thresholds and, if both thresholds are exceeded, then read rinsing is enabled. In one embodiment, the thresholds for enabling read rinsing are different from the thresholds for enabling write-throughs. If read rinsing is not enabled, the process 500 returns to block 501.

At block 529, if the monitoring circuitry 323 determines that sufficient memory bandwidth is available, then the memory interface 324 performs a read rinse by updating the backing data corresponding to the read request so that the backing data matches its corresponding data in the cache 320. The memory interface 324 sends a write request with the data to the memory controller 311, and the counter 401 is incremented to count the read rinse transaction in the current time period. At block 533, the cache read/write logic 322 deasserts the 'dirty' bit for the cached entry to indicate that the cached data in the memory-side cache device 320 matches its backing data in the DRAM device 310. From block 533, the process 500 returns to block 501.

Blocks 505-533 thus repeat for each read request received at the I/O port 321 of the cache device 320 to perform cache read rinsing when sufficient memory bandwidth is available and when the number of read rinse transactions has not exceeded a maximum number. As a result of the above write through and read rinsing mechanisms, spare memory bandwidth that is available during phases in which the cache 320 experiences a high hit rate is utilized for maintaining clean data in the cache 320, thus allowing optimal memory write sequences to be preserved and reducing the number of victims that are written back to the DRAM 310.

A method includes, in response to each write request of a plurality of write requests received at a memory-side cache device coupled with a memory device, writing payload data specified by the write request to the memory-side cache device, and when a first bandwidth availability condition is satisfied, performing a cache write-through. The cache write-through is performed by writing the payload data to the memory device and recording an indication that the payload data written to the memory-side cache device matches the payload data written to the memory device.

In the method, for each write request of the plurality of write requests, writing the payload data specified by the write request includes storing the data in an entry of the memory-side cache device. Recording the indication includes deasserting a dirty bit in a tag associated with the entry.

The method further includes receiving the plurality of write requests at the memory-side cache according to a write sequence. Writing the payload data to the memory device is performed in an order corresponding to the write sequence.

The method further includes, in response to each read request of a plurality of read requests received at the memory-side cache device, when the read request causes a cache hit in the memory-side cache, and responsive to an indication that cached data requested by the read request differs from backing data in the memory device, updating the backing data to match the cached data and recording an indication that the cached data in the memory-side cache matches the backing data in the memory device.

The method of also includes determining a first bandwidth availability metric of the memory device. The first bandwidth availability condition is satisfied when the first bandwidth availability metric is greater than a first bandwidth threshold.

The method further includes determining a second bandwidth availability metric for the memory device based on an amount of available space in each of a command queue of the memory device and a write data buffer of the memory device. The updating of the backing data is further performed in response to determining that the second bandwidth availability metric is greater than a second bandwidth threshold.

The method further includes determining the first bandwidth availability metric based on an amount of available space in each of a command queue of the memory device and a write data buffer of the memory device.

The method further includes determining when the first bandwidth condition is satisfied based on an indication of available bandwidth received from the memory device.

In the method, for each write request of the plurality of write requests, performing the cache write-through further includes incrementing a counter value for a current time period, and the cache write-through is performed in response to determining that the counter value is less than a maximum number of cache write-through transactions for the current time period.

A memory-side cache device includes cache read/write logic for, in response to each write request of a plurality of write requests received at a memory-side cache device coupled with a memory device, writing payload data specified by the write request to the memory-side cache device, and a memory interface for, in response to each write request of the plurality of write requests, performing a cache write-through when a first bandwidth availability condition is satisfied by writing the payload data to the memory device. The cache read/write logic performs the cache write-through by recording an indication that the payload data written to the memory-side cache device matches the payload data written to the memory device.

In the memory-side cache device, the cache read/write logic, for each write request of the plurality of write requests, writes the payload data specified by the write request by storing the data in an entry of the memory-side cache device, and records the indication by deasserting a dirty bit in a tag associated with the entry.

The memory-side cache device further includes an input/output port for receiving the plurality of write requests according to a write sequence. The memory interface writes the payload data to the memory device in an order corresponding to the write sequence.

In the memory-side cache device, the memory interface, in response to each read request of a plurality of read requests received at the memory-side cache device, when the read request causes a cache hit in the memory-side cache, and responsive to an indication that cached data requested by the read request differs from backing data in the memory device, performs a read rinse by updating the backing data to match the cached data. The cache read/write logic performs the read rinse by recording an indication that the cached data in the memory-side cache matches the backing data in the memory device.

The memory-side cache device also includes monitoring circuitry to determine a first bandwidth availability metric based on an amount of available space in each of a command queue of the memory device and a write data buffer of the memory device. The first bandwidth availability condition is satisfied when the first bandwidth availability metric is greater than a first bandwidth threshold.

In the memory-side cache device, the monitoring circuitry determines a second bandwidth availability metric for the memory device based on an amount of available space in each of a command queue of the memory device and a write data buffer of the memory device. The memory interface updates the backing data in response to determining that the second bandwidth availability metric is greater than a second bandwidth threshold.

The memory-side cache device includes monitoring circuitry to determine when the first bandwidth availability condition is satisfied based on an indication of available bandwidth received from the memory device.

The memory-side cache device also includes a counter to, for each write request of the plurality of write requests, perform the cache write-through by incrementing a counter value for a current time period. The cache write-through is performed in response to determining that the counter value is less than a maximum number of cache write-through transactions for the current time period.

A computing system includes a memory device to store backing data, a memory-side cache device coupled with the memory device to, in response to each write request of a plurality of write requests received at the memory-side cache device, write payload data specified by the write request to the memory-side cache device, and when the first bandwidth availability condition is satisfied, perform a cache write-through. The cache write-through is performed by writing the payload data to the memory device, and recording an indication that the payload data written to the memory-side cache device matches the payload data written to the memory device.

In the computing system, the memory-side cache device determines a first bandwidth availability metric of the memory device. The first bandwidth availability condition is satisfied when the first bandwidth availability metric is greater than a first bandwidth threshold;

In the computing system, the memory-side cache device, in response to each read request of a plurality of read requests received at the memory-side cache device, when the read request causes a cache hit in the memory-side cache, and responsive to an indication that cached data requested by the read request differs from backing data in the memory device, updates the backing data to match the cached data, records an indication that the cached data in the memory-side cache matches the backing data in the memory device, and determines a second bandwidth availability metric for the memory device based on an amount of available space in each of a command queue of the memory device and a write data buffer of the memory device. The updating of the backing data is further performed in response to determining that the second bandwidth availability metric is greater than a second bandwidth threshold.

The computing system further includes a coherent slave device for receiving the plurality of write requests via a data fabric interconnect, determining a write sequence for the plurality of write requests, and transmitting the plurality of write requests to the memory-side cache device according to the write sequence, wherein writing the payload data to the memory device is performed in an order corresponding to the write sequence.

The computing system further includes a data fabric interconnect coupled with the memory-side cache device for transmitting memory transactions including the plurality of write requests from one or more processing units to the memory-side cache device.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method, comprising:
in response to each read request of a plurality of read requests received at a memory-side cache device:
detecting an indication that cached data requested by the read request differs from backing data in a memory device coupled with the memory-side cache device when the read request causes a cache hit in the memory-side cache device;
in response to detecting the indication, performing a read rinse transaction by updating the backing data to match the cached data;
recording an indication that the cached data in the memory-side cache device matches the backing data in the memory device; and
in response to each write request of a plurality of write requests received at the memory-side cache device writing payload data specified by the write request to the memory-side cache device by storing the data in an entry of the memory-side cache device.

2. The method of claim 1, further comprising:
when a first bandwidth availability condition is satisfied, performing a cache write-through by:
writing the payload data to the memory device, and
recording an indication that the payload data written to the memory-side cache device matches the payload data written to the memory device by deasserting a dirty bit in a tag associated with the entry.

3. The method of claim 2, further comprising:
receiving the plurality of write requests at the memory-side cache device according to a write sequence, wherein writing the payload data to the memory device is performed in an order corresponding to the write sequence.

4. The method of claim 2, further comprising:
determining a first bandwidth availability metric of the memory device, wherein the first bandwidth availability condition is satisfied when the first bandwidth availability metric is greater than a first bandwidth threshold.

5. The method of claim 4, further comprising:
determining a second bandwidth availability metric for the memory device based on an amount of available space in each of a command queue of the memory device and a write data buffer of the memory device, wherein the updating of the backing data is further performed in response to determining that the second bandwidth availability metric is greater than a second bandwidth threshold.

6. The method of claim 4, further comprising:
determining the first bandwidth availability metric based on an amount of available space in each of a command queue of the memory device and a write data buffer of the memory device.

7. The method of claim 2, further comprising:
determining when the first bandwidth availability condition is satisfied based on an indication of available bandwidth received from the memory device.

8. The method of claim 2, wherein, for each write request of the plurality of write requests:
performing the cache write-through further comprises incrementing a counter value for a current time period, and
the cache write-through is performed in response to determining that the counter value is less than a maximum number of cache write-through transactions for the current time period.

9. The method of claim 1, wherein the read rinse transaction is performed when an available bandwidth of the memory device is greater than a threshold and a number of read rinse transactions recorded by a counter during a time period is less than a maximum number of read rinse transactions for the time period.

10. A memory-side cache device, comprising:
a memory interface configured to, in response to each read request of a plurality of read requests received at the memory-side cache device:
detect an indication that cached data requested by the read request differs from backing data in a memory device coupled with the memory-side cache device when the read request causes a cache hit in the memory-side cache device;
in response to detecting the indication, perform a read rinse transaction by updating the backing data to match the cached data; and
record an indication that the cached data in the memory-side cache device matches the backing data in the memory device; and
cache read/write logic configured to, for each write request of a plurality of write requests received at the memory-side cache device, write payload data specified by the write request by storing the payload data in an entry of the memory-side cache device.

11. The memory-side cache device of claim 10,
wherein the memory interface is further configured to, in response to each write request of the plurality of write requests, perform a cache write-through when a first bandwidth availability condition is satisfied by writing the payload data to a memory device coupled with the memory-side cache device, wherein the cache read/write logic is further configured to record an indication that the payload data written to the memory-side cache device matches the payload data written to the memory device by deasserting a dirty bit in a tag associated with the entry.

12. The memory-side cache device of claim 11, further comprising:
an input/output port configured to receive the plurality of write requests according to a write sequence, wherein the memory interface is further configured to write the payload data to the memory device in an order corresponding to the write sequence.

13. The memory-side cache device of claim 11, further comprising monitoring circuitry configured to:
determine a first bandwidth availability metric based on an amount of available space in each of a command queue of the memory device and a write data buffer of the memory device, wherein the first bandwidth availability condition is satisfied when the first bandwidth availability metric is greater than a first bandwidth threshold.

14. The memory-side cache device of claim 13, wherein:
the monitoring circuitry is further configured to determine a second bandwidth availability metric for the memory device based on an amount of available space in each of a command queue of the memory device and a write data buffer of the memory device; and
the memory interface is configured to update the backing data in response to determining that the second bandwidth availability metric is greater than a second bandwidth threshold.

15. The memory-side cache device of claim 11, further comprising:
monitoring circuitry configured to determine when the first bandwidth availability condition is satisfied based on an indication of available bandwidth received from the memory device.

16. The memory-side cache device of claim 11, further comprising a counter configured to, for each write request of the plurality of write requests:
perform the cache write-through by incrementing a counter value for a current time period, wherein the cache write-through is performed in response to determining that the counter value is less than a maximum number of cache write-through transactions for the current time period.

17. The memory-side cache device of claim 10, wherein the read rinse transaction is performed when an available bandwidth of the memory device is greater than a threshold, and a number of read rinse transactions recorded by a counter during a time period is less than a maximum number of read rinse transactions for the time period.

18. A computing system, comprising:
a memory device configured to store backing data; and
a memory-side cache device coupled with the memory device,
wherein the memory-side cache device is configured to, in response to each read request of a plurality of read requests received at the memory-side cache device;
detect an indication that cached data requested by the read request differs from backing data in a memory device coupled with the memory-side cache device when the read request causes a cache hit in the memory-side cache device;
in response to detecting the indication, perform a read rinse transaction by updating the backing data to match the cached data; and
record an indication that the cached data in the memory-side cache device matches the backing data in the memory device; and
wherein the memory-side cache device is configured to, in response to each write request of a plurality of write requests received at the memory-side cache device write payload data specified by the write request to the memory-side cache device by storing the data in an entry of the memory-side cache device.

19. The computing system of claim 18, wherein the memory-side cache device is further configured to:
when a first bandwidth availability condition is satisfied, perform a cache write-through by:
writing the payload data to the memory device, and
record an indication that the payload data written to the memory-side cache device matches the payload data written to the memory device; and
determine a first bandwidth availability metric of the memory device, wherein the first bandwidth availability condition is satisfied when the first bandwidth availability metric is greater than a first bandwidth threshold.

20. The computing system of claim 19, wherein the memory-side cache device is further configured to determine a second bandwidth availability metric for the memory device based on an amount of available space in each of a command queue of the memory device and a write data buffer of the memory device, wherein the updating of the backing data is further performed in response to determining that the second bandwidth availability metric is greater than a second bandwidth threshold.

21. The computing system of claim 19, further comprising:
a coherent slave device configured to:
receive the plurality of write requests via a data fabric interconnect;
determine a write sequence for the plurality of write requests; and
transmit the plurality of write requests to the memory-side cache device according to the write sequence, wherein writing the payload data to the memory device is performed in an order corresponding to the write sequence.

22. The computing system of claim 19, further comprising:
a data fabric interconnect coupled with the memory-side cache device and configured to transmit memory transactions including the plurality of write requests from one or more processing units to the memory-side cache device.

* * * * *